US012571915B2

(12) United States Patent
Kato et al.

(10) Patent No.: US 12,571,915 B2
(45) Date of Patent: Mar. 10, 2026

(54) MEASUREMENT APPARATUS AND MEASUREMENT METHOD

(71) Applicant: Mitutoyo Corporation, Kanagawa (JP)

(72) Inventors: Ryusuke Kato, Ibaraki (JP); Tomotaka Takahashi, Ibaraki (JP)

(73) Assignee: Mitutoyo Corporation, Kanagawa (JP)

( * ) Notice: Subject to any disclaimer, the term of this patent is extended or adjusted under 35 U.S.C. 154(b) by 1277 days.

(21) Appl. No.: 17/322,763

(22) Filed: May 17, 2021

(65) Prior Publication Data

US 2021/0356591 A1 Nov. 18, 2021

(30) Foreign Application Priority Data

May 18, 2020 (JP) .................................. 2020-086648

(51) Int. Cl.
*G01S 17/32* (2020.01)
*G01B 11/00* (2006.01)
(Continued)

(52) U.S. Cl.
CPC .............. *G01S 17/32* (2013.01); *G01B 11/00* (2013.01); *G01S 7/4814* (2013.01);
(Continued)

(58) Field of Classification Search
CPC ...... G01S 17/32; G01S 7/4814; G01S 7/4917; G01S 17/34; G01S 7/4812; G01B 11/02; G01B 11/00
See application file for complete search history.

(56) References Cited

U.S. PATENT DOCUMENTS

2013/0235386 A1* 9/2013 Osawa ............... G01B 11/2441
356/511
2018/0164089 A1* 6/2018 Schönleber ........ G01B 9/02035

FOREIGN PATENT DOCUMENTS

JP H09218016 A * 8/1997 ............. G01N 21/45
JP 3583906 8/2004
(Continued)

OTHER PUBLICATIONS

Fowles, Introduction to Modern Optics, 1975, New York: Holt, Rinehart, and Winston, 2nd ed, pp. 297-301 (Year: 1975).*
(Continued)

*Primary Examiner* — Yuqing Xiao
*Assistant Examiner* — Andrea Maria Baca
(74) *Attorney, Agent, or Firm* — Oblon, McClelland, Maier & Neustadt, L.L.P.

(57) ABSTRACT

A measurement apparatus includes a laser apparatus, a branching part that splits a laser beam into reference light and measurement light, a condensing part that condenses the measurement light onto an object to be measured, a control part that adjust a focal position where the condensing part condenses the measurement light, and a distance calculation part that calculates distance to the object to be measured on the basis of an optical path difference between the reference light and the measurement light, wherein the condensing part includes a first lens and a correspondence calculation part that calculates a correspondence between a focal position of the condensing part and a position of the first lens on the basis of a position of the first lens and a distance to the object to be measured.

11 Claims, 5 Drawing Sheets

(51) Int. Cl.
| | |
|---|---|
| *G01B 11/02* | (2006.01) |
| *G01S 7/481* | (2006.01) |
| *G01S 7/4912* | (2020.01) |
| *G01S 17/34* | (2020.01) |

(52) U.S. Cl.
CPC ............ *G01S 7/4917* (2013.01); *G01S 17/34* (2020.01); *G01B 11/02* (2013.01)

(56) References Cited

FOREIGN PATENT DOCUMENTS

| | | | | |
|---|---|---|---|---|
| JP | 2015052537 A | * | 3/2015 | ............. G01B 11/24 |
| WO | WO 2013/084616 A1 | | 6/2013 | |

OTHER PUBLICATIONS

Takefumi Hara; "Distance Sensing by FSL Laser and Its Application", OPTONEWS; vol. 7, No. 3, 2012; 10 pgs.

Office Action dated Dec. 6, 2025, issued in counterpart CN Application No. 202110538600.3, citing document No. 1, with English Translation. (17 pages).

* cited by examiner

MEASUREMENT APPARATUS AND MEASUREMENT METHOD

CROSS-REFERENCE TO RELATED APPLICATIONS

The present application claims priority to Japanese Patent Application number 2020-086648, filed on May 18, 2020. The contents of this application are incorporated herein by reference in their entirety.

BACKGROUND

Measurement apparatuses for measuring a distance to an object to be measured on the basis of the time from radiating a light to an object to be measured to receiving a light reflected from the object to be measured have been described. Also, as a light source of such a measurement apparatus, a frequency-shifted feedback laser (FSFL) which is provided with a frequency shifter in a resonator and outputs a plurality of longitudinal-mode lasers whose oscillation frequencies vary linearly as time passes is known. Further, an optical distance meter using such an FSFL is known (see, e.g., Patent Document 1: Japanese Patent No. 3583906, Non-Patent Documents 1: Takefumi Hara, "Distance Sensing by FSF Laser and Its Application," Optonews, Vol. 7, No. 3, 2012, pp. 25-31 and 2, and Non-Patent Documents 2: Takefumi Hara et al., "Ultra-high-precision optical measurement technology by frequency shift feedback laser", applied physics, Vol. 74, No. 6, 2005).

In such a measurement apparatus, a condenser lens that focuses measurement light onto a portion of an object to be measured may be used to improve utilization efficiency of a reflected light. In this case, if the focal position of the condenser lens matches a portion of the object to be measured, the received light intensity of the reflected light increases. On the other hand, if the focal position of the condenser lens is deviated from the object to be measured due to movement of the object to be measured, the geometry of the object to be measured, or the like, the received light intensity of the reflected light decreases in accordance with the amount of deviation, for example. Therefore, an optical system has to be adjusted using an autofocus operation or the like so as to reduce influences of the deviation of the focal position of the condenser lens.

BRIEF SUMMARY

The present disclosure has been made in view of these points and an object thereof is to quickly adjust an optical system so as to improve efficiency in receiving reflected light in a measurement apparatus such as an optical distance meter.

Approach for Solving the Problems

The first aspect of the present disclosure provides a measurement apparatus including a laser apparatus that outputs a laser beam, a branching part that splits the laser beam into (i) a reference light, which is a portion of the laser beam, for being radiated to a reference surface, and (ii) a measurement light, which is at least part of the remaining portion of the laser beam, for being radiated to an object to be measured, a condensing part that condenses the measurement light onto the object to be measured, a control part that adjust a focal position where the condensing part condenses light, a distance calculation part that calculates the distance to the object to be measured on the basis of an optical path difference between the reference light reflected by the reference surface and the measurement light reflected by the object to be measured, wherein the condensing part includes a first lens where the measurement light enters, a moving part that moves the first lens in an optical axis direction, a position detection part that detects the position of the first lens, a second lens that radiates the measurement light emitted from the first lens towards the object to be measured, a correspondence calculation part that calculates correspondence between a focal position of the condensing part and a position of the first lens on the basis of the position of the first lens and the distance to the object to be measured calculated by the distance calculation part when the condensing part is focused on the object to be measured, wherein the control part controls the moving part and moves the first lens to adjust the focal position where the second lens condenses the measurement light.

The second aspect of the present disclosure provides a measurement method including the steps of outputting a laser beam, splitting the laser beam into (i) a reference light, which is a portion of the laser beam, for being radiated to the reference surface, and (ii) a measurement light, which is at least part of the remaining portion of the laser beam, for being radiated to the object to be measured, condensing the measurement light by focusing the measurement light on the object to be measured using a condensing part having a first lens and a second lens, calculating a distance to the object to be measured on the basis of an optical path difference between the reference light reflected by the reference surface and the measurement light reflected by the object to be measured, calculating a correspondence between the focal position of the condensing part and the position of the first lens on the basis of the position of the first lens and the calculated distance to the object to be measured, wherein the condensing includes making the measurement light enter the first lens, radiating, through the second lens, the measurement light emitted from the first lens towards the object to be measured, moving the first lens so that the focal position where the second lens condenses the measurement light is aligned on the object to be measured, and detecting the position of the first lens.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution of the disclosure.

<Configuration Example of the Measurement Apparatus 100>

Figure 1:
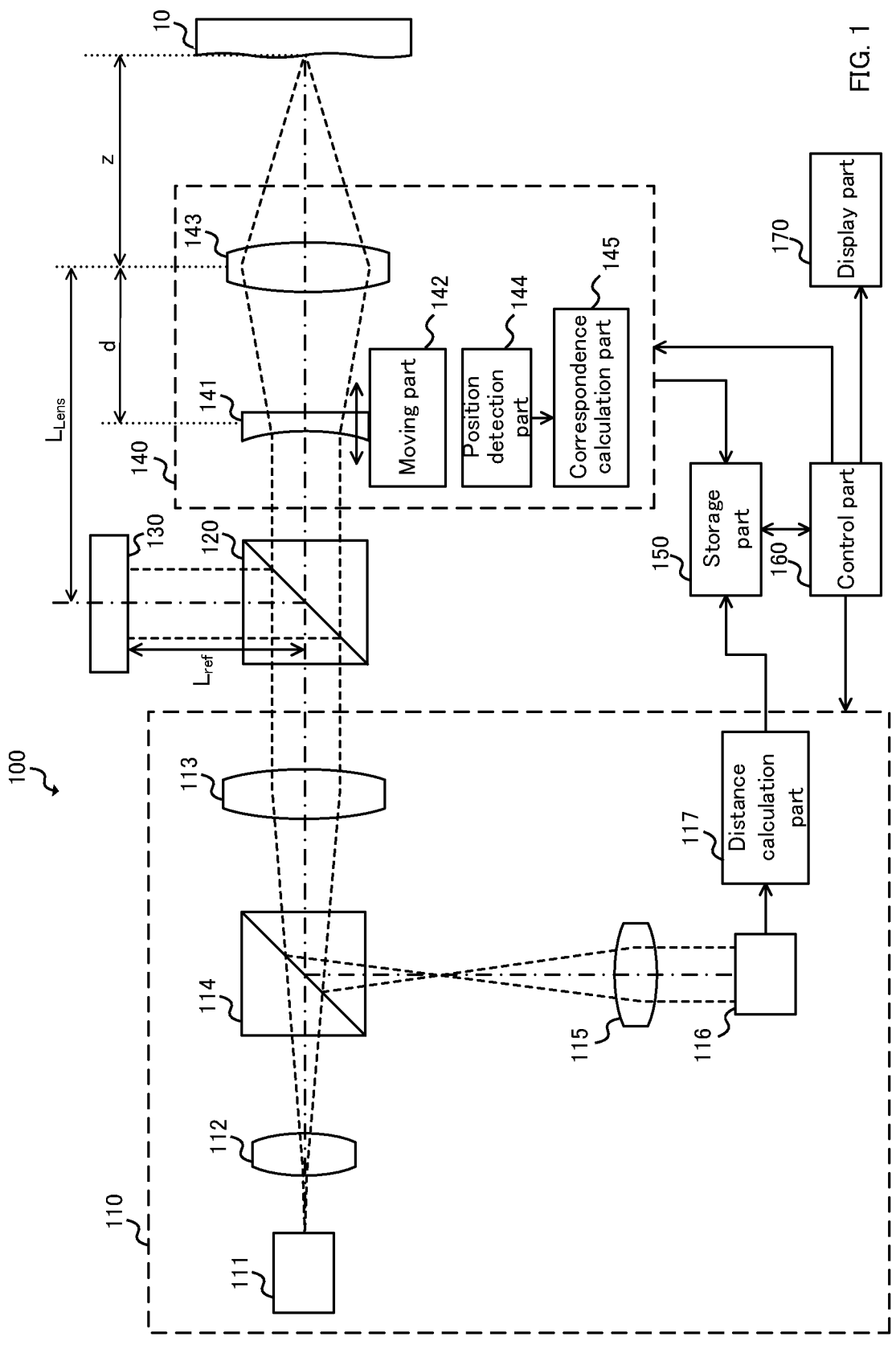
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 measures the distance from the measurement apparatus 100 to the object to be measured 10. The measurement apparatus 100 measures the distance to one or a plurality of locations of the object to be measured 10. The measurement apparatus 100 may measure the distance to a plurality of locations of the object to be measured 10 to measure the geometry of the object to be measured 10, for example. The object to be measured 10 is, for example, a solid body such as a semiconductor wafer including Si, GaAs, GaN or the like, a high-precision mirror, a metal, or a resin. The measurement apparatus 100 includes an interferometer 110, a branching part 120, a reference surface 130, a condensing part 140, a storage part 150, a control part 160, and a display part 170.

The interferometer 110 outputs a laser beam and detects the interference of the laser beams reflected by the object to be measured 10 and the reference surface 130. The interferometer 110 includes a laser apparatus 111, a magnifying lens 112, a collimating lens 113, a beam splitter 114, an image forming lens 115, an interference detection part 116, and a distance calculation part 117. It should be noted that the configuration of the interferometer 110 shown in FIG. 1 is an example and is not limited thereto, and may be any configuration for calculating the distance by detecting the interference of the laser beam.

The laser apparatus 111 outputs a laser beam. The laser apparatus 111 has a laser resonator and outputs a frequency-modulated laser beam with a plurality of modes, for example. In this case, the laser apparatus 111 is provided with a frequency shifter in the resonator and outputs a plurality of longitudinal-mode lasers whose oscillation frequencies vary linearly as time passes. As an example, the laser apparatus 111 is a frequency-shifted feedback laser. Since the frequency-shifted feedback laser is known as described in Non-Patent Document 1 and Non-Patent Document 2 and the like, detailed description thereof is omitted here.

The magnifying lens 112 enlarges the diameter of the light outputted from the laser apparatus 111. The collimating lens 113 collimates the light entering from the magnifying lens 112 and outputs a collimated light. Further, the light reflected by the object to be measured 10 and the reference surface 130 enters the collimating lens 113, and the collimating lens 113 emits a light generated by reducing the diameter of the incident light to emit the light to the beam splitter 114.

The beam splitter 114 reflects portions of the measurement light and the reference light emitted from the collimating lens 113 toward the interference detection part 116. The beam splitter 114 includes a half mirror, for example. The image forming lens 115 forms an image of the light reflected by the beam splitter 114 onto the interference detection part 116. That is, the image forming lens 115 provides an interference signal generated by interference of the measurement light and the reference light to the interference detection part 116.

The interference detection part 116 detects an interference signal based on an optical path difference between the reference light and the measurement light. The interference detection part 116 detects the light intensity level of the interference signal based on the reference light and the measurement light. The interference detection part 116 is, for example, an imaging element or the like for detecting the interference signal as an image. The interference detection part 116 may be an optical detector such as a photodetector.

The distance calculation part 117 calculates the distance to the object to be measured 10 on the basis of the optical path difference between the reference light reflected by the reference surface 130 and the measurement light reflected by the object to be measured 10. The distance calculation part 117 calculates the distance to the object to be measured 10 corresponding to a phase difference of the interference signal, for example. The distance calculation part 117 may calculate the distance to the object to be measured 10 by a known operation as described in the Non-Patent Document 2, and a detailed explanation thereof is omitted here.

The distance calculation part 117 may calculate an absolute distance corresponding to the optical path difference between the reference light and the measurement light. Further, the distance calculation part 117 may calculate the distance obtained by adding a predetermined offset distance to the calculated absolute distance. The offset distance is a value that determines a position used as a reference in a distance measurement by the measurement apparatus 100.

The branching part 120 splits the laser beam into (i) the reference light, which is a portion of the laser beam, for being radiated to the reference surface 130 and (ii) the measurement light, which is the at least part of the remaining portion of the laser beam, for being radiated to the object to be measured 10. Further, the branching part 120 returns the reference light reflected by the reference surface 130 and the measurement light reflected by the object to be measured 10 to the interferometer 110. The branching part 120 is a beam splitter, for example.

The reference surface 130 reflects the laser beam radiated from the branching part 120. The reference surface 130 preferably has a mirror surface that totally reflects the laser beam. It should be noted that the reference surface 130 may be provided between the interferometer 110 and the condensing part 140. In this case, the reference surface 130 is a half mirror that functions as the branching part 120 which reflects a portion of the laser beam and transmits a portion of the remaining laser beam, as an example.

The condensing part 140 includes a plurality of lenses, and condenses the measurement light onto the object to be measured 10. FIG. 1 shows an example of the condensing part 140 including two lenses. The condensing part 140 includes a first lens 141, a moving part 142, a second lens 143, a position detection part 144, and a correspondence calculation part 145.

The measurement light from the interferometer 110 enters the first lens 141. The first lens 141 is, as an example, a concave lens, which enlarges the spot size of the incident measurement light. The first lens 141 is provided to be movable in an optical axis direction. The focal position where the condensing part 140 condenses light changes in the optical axis direction by moving the first lens 141. When the first lens 141 is moved in the direction toward the object to be measured 10, the focal position of the condensing part 140 changes in the direction away from the condensing part 140, for example.

The moving part 142 moves the first lens 141 in the optical axis direction. The moving part 142 moves the first lens 141 in response to a control signal from the control part 160. The moving part 142 is an actuator such as a motor, for example.

The second lens 143 radiates the measurement light emitted from the first lens 141 toward the object to be measured 10. Further, the second lens 143 condenses the measurement light reflected from the object to be measured 10 to radiate this light to the first lens 141. The second lens 143 is a lens that is in a fixed position in the optical axis direction, for example. The second lens 143 is a convex lens, for example.

The position detection part 144 detects the position of the first lens 141. The position detection part 144 detects the position of the first lens 141 in the optical axis direction, for example. In this case, the position detection part 144 detects the distance between the first lens 141 and the second lens 143 as the position of the first lens 141 with reference to the second lens 143. Here, the distance between the first lens 141 and the second lens 143 is defined as an inter-lens distance d. It should be noted that the inter-lens distance d detected by the position detection part 144 may be a relative value.

The correspondence calculation part 145 calculates the correspondence between the focal position of the condensing part 140 and the position of the first lens 141 on the basis of the position of the first lens 141 and the distance to the object to be measured 10 calculated by the distance calculation part 117 when the condensing part 140 is focused on the object to be measured 10. The focal position of the condensing part 140 is a distance from the second lens 143 to a focal point, with the second lens 143 as a reference, for example. Here, the distance from the second lens 143 to the focal point is defined as a condensing distance z. That is, the correspondence calculation part 145 calculates the correspondence between the condensing distance z and the inter-lens distance d.

The storage part 150 stores the calculation result of the correspondence calculation part 145. The storage part 150 may also store information concerning the geometry of the object to be measured 10. Further, the storage part 150 may respectively store intermediate data, a calculation result, a threshold, a parameter, or the like, which are generated (or used) by the measurement apparatus 100 in a process of operations. Further, the storage part 150 may provide the stored data to a requester in response to a request from each part in the measurement apparatus 100.

The control part 160 controls the operations of the measurement apparatus 100. The control part 160 controls the interferometer 110 and the condensing part 140 to condense the measurement light outputted from the interferometer 110 and focus this light on a portion of the object to be measured 10. Further, the control part 160 controls the interferometer 110 and the display part 170, and displays the measurement result of the interferometer 110 on the display part 170.

The control part 160 adjusts the focal position where the condensing part 140 condenses light, for example. The control part 160 controls the moving part 142 to move the first lens 141 to adjust the focal position where the second lens 143 condenses the measurement light. The control part 160 moves the first lens 141 on the basis of the correspondence between the condensing distance z and the inter-lens distance d, for example. In accordance with the determination of the condensing distance z corresponding to the position to condense light, the control part 160 moves the first lens 141 to a position at which the inter-lens distance d corresponds to the condensing distance z, as an example. The control part 160 may move the first lens 141 on the basis of the geometry of the object to be measured 10. Further, the control part 160 may specify the condensing distance z corresponding to the position of the first lens 141 in accordance with the determination of the position of the first lens 141.

Further, the control part 160 may move the first lens 141 on the basis of the calculation result of the distance to the object to be measured 10 by the distance calculation part 117. The control part 160 moves the first lens 141 to the inter-lens distance d corresponding to the condensing distance z corresponding to the calculation result of the distance, for example. Further, the control part 160 may move the first lens 141 on the basis of the magnitude of the interference signal detected by the interference detection part 116. The control part 160 may move the first lens 141 such that the received light intensity of the measurement light improves, in which case the operation of the control part 160 functions as an autofocus operation.

The control part 160 may store the correspondence calculated by the correspondence calculation part 145 in the storage part 150. Further, the control part 160 may store the measurement result of the measurement apparatus 100 in the storage part 150. The control part 160 may store the measurement results or the like of the measurement apparatus 100 in an external database or the like, in which case the control part 160 is preferably connected to a network or the like.

The display part 170 includes a display or the like, and displays the measurement result of the interferometer 110. Further, the display part 170 may display the status and process or the like of the control operation of the control part 160. The display part 170 may receive a control instruction or the like from a user or the like, and supply this control instruction to the control part 160.

The measurement apparatus 100 according to the present embodiment described above condenses the measurement light onto a portion of the surface of the object to be measured 10 by the condensing part 140 to measure the distance to the object to be measured 10 by improving efficiency in receiving the reflected light. In this case, the movement or variation and the complex or fine geometry or the like of the object to be measured 10 cause the focal position of the condensing part 140 to deviate from the object to be measured 10, which reduces efficiency in receiving the reflected light.

Accordingly, the autofocus operation of the measurement apparatus 100 may be executed to improve the received light intensity of the reflected light, but the autofocus operation sometimes takes longer. Here, it is conceivable to set lens positions as references of a plurality of lenses in advance to speed up the autofocus operation. However, such a default setting requires the measurement of the inter-lens distance d with a separate device or the like from the measurement apparatus 100, or previous focus adjustment by accurately arranging the position serving as the reference and the object to be measured 10, which has been time consuming. In particular, when the measurement apparatus 100 is moved for a measurement, it has been difficult to perform such a default setting for each moving location.

Therefore, the measurement apparatus 100 according to the present embodiment acquires the correspondence between the condensing distance z and the inter-lens distance d using the measurement result of the measurement apparatus 100 itself, which allows focusing on the surface of the object to be measured 10 easily without performing such a default setting. Such an operation of the measurement apparatus 100 will be described below.

<Example of an Operation of the Measurement Apparatus 100>

Figure 2:
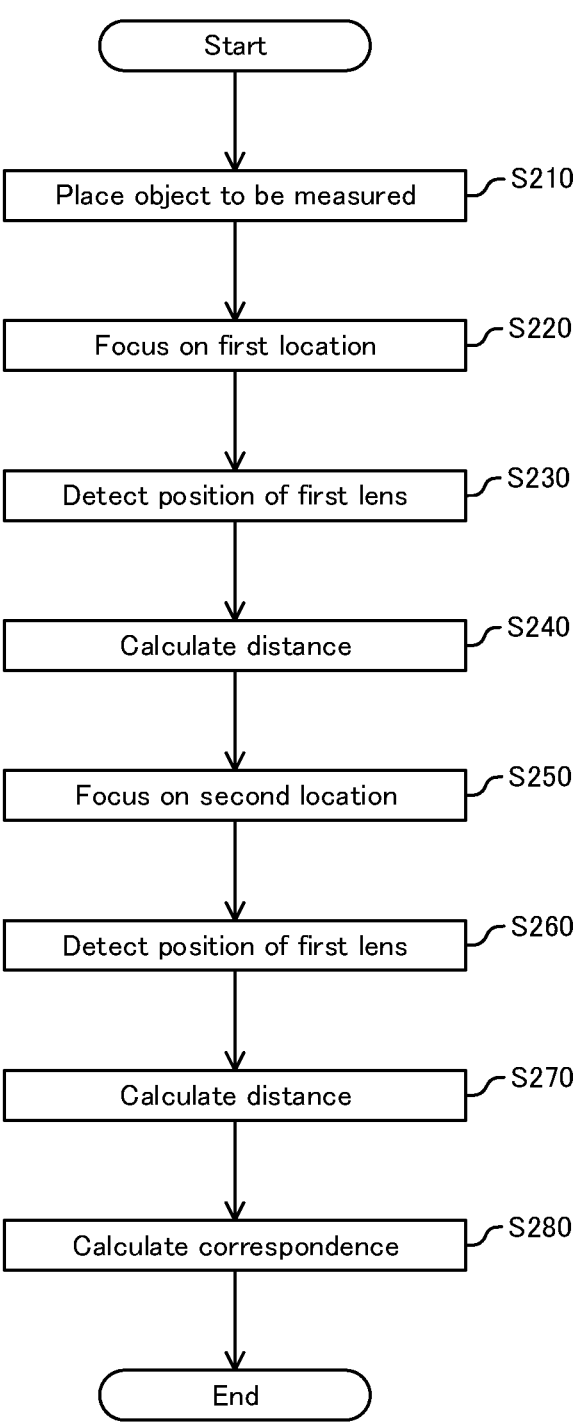
FIG. 2 is a flowchart illustrating one example of an operation of the measurement apparatus 100 according to the present embodiment.

FIG. 2 is a flowchart illustrating one example of an operation of the measurement apparatus 100 according to the present embodiment. The measurement apparatus 100 performs a setting for the measurement operation by executing the operations from step S210 to step S280. The measurement apparatus 100 may execute the operations from step S210 to step 280 as a default setting or execute the operations prior to measuring the distance.

First, the object to be measured 10 is placed in a measurable range of the measurement apparatus 100 (S210). Then, the measurement apparatus 100 performs focusing by condensing the measurement light at the first location on the object to be measured 10 (S220). The first location on the object to be measured 10 may be a portion of the surface of the predetermined object to be measured 10, or may alternatively be the region determined by a user or the like. The first location on the object to be measured 10 is a position as a reference with respect to the condensing part 140.

The laser apparatus 111 outputs a laser beam, and the branching part 120 splits the laser beam into (i) the reference light, which is a portion of the laser beam, for being irradiated to the reference surface 130 and (ii) the measurement light, which is at least part of the remaining portion of the laser beam, for being radiated onto the object to be measured 10, for example. Then, the measurement apparatus 100 focuses the measurement light onto the object to be measured 10 using the condensing part 140 to condense the measurement light. The condensing part 140 makes the measurement light enter the first lens 141 and radiates, from the second lens 143, the measurement light emitted from the first lens 141 toward the object to be measured 10. Then, the measurement apparatus 100 moves the first lens 141 so that the focal position of the second lens 143 for condensing the measurement light is aligned on the object to be measured 10.

The measurement apparatus 100 focuses the measurement light onto the first location using an autofocus function, for example. Such an autofocus function is performed by the control part 160, for example. Here, the distance from the second lens 143 to the focal point aligned with the first location is defined as a condensing distance $z_1$.

The position detection part 144 then detects the position of the first lens 141 (S230). The position detection part 144 detects the inter-lens distance between the first lens 141 and the second lens 143. Here, an inter-lens distance in a case where the condensing part 140 is focused on the first location on the object to be measured 10 is defined as $d_1$.

Next, the distance calculation part 117 calculates the distance to the object to be measured 10 on the basis of an optical path difference between the reference light reflected by the reference surface and the measurement light reflected by the object to be measured 10 (S240). The distance calculation part 117 calculates the distance to the first location in response to focusing the measurement light at the first location on the object to be measured 10. Here, the distance calculated by the distance calculation part 117 is the absolute distance corresponding to the optical path difference between the measurement light and the reference light, for example.

In FIG. 1, the distance from branching part 120 to the reference surface 130 is defined as $L_{ref}$, and the distance from the branching part 120 to the second lens 143 is defined as $L_{lens}$. When the condensing part 140 is focused on the first location on the object to be measured 10, the optical path difference between the measurement light and the reference light is 2 $(L_{Lens}+z_1-L_{ref})$. Supposing that the absolute distance from the measurement apparatus 100 to the first location is the first distance $L_1$, the first distance $L_1$ is $(L_{Lens}+z_1-L_{ref})$. Here, $(L_{Lens}-L_{ref})$ is the inner optical path difference of the measurement apparatus 100.

Next, the measurement light is condensed and focused onto the second location on the object to be measured 10 using the measurement apparatus 100 (S250). The second location on the object to be measured 10 may be, for example, a portion of the surface of the predetermined object to be measured 10 when the object to be measured 10 is moved in the optical axis direction, or alternatively may be a region determined by a user or the like. The second location on the object to be measured 10 may be substantially equal to the first location on the object to be measured 10 after the movement, or may differ from the first location. Additionally, the second location on the object to be measured 10 may differ from the first location when the position of the object to be measured 10 is left unchanged.

Thus, the first location and the second location may be any positions whose distances from the condensing part 140 differ from each other. It should be noted that the first location and the second location are preferably predetermined so that the difference in inter-lens distances with respect to each location is as large as possible. The measurement apparatus 100 focuses the measurement light on the second location in the same operation as the operation in which the measurement light is focused on the first location. Here, the distance from the second lens 143 to the focal position aligned with the first location is defined as a condensing distance $z_2$.

The position detection part 144 then detects the position of the first lens 141 (S260). The position detection part 144 detects the inter-lens distance between the first lens 141 and the second lens 143. Here, an inter-lens distance in a case where the condensing part 140 is focused on the second location on the object to be measured 10 is defined as $d_2$.

The distance calculation part 117 then calculates the distance to the object to be measured 10 (S270). The distance calculation part 117 calculates the distance to the second location using the same operation as for the calculation of the distance to the first location, in response to focusing the measurement light on the second location on the object to be measured 10. Here, the distance from the measurement apparatus 100 to the second location is defined as a second distance $L_2$. The second distance $L_2$ is $L_{Lens}+z_2-L_{ref}$, for example.

Next, the correspondence calculation part 145 calculates the correspondence between the focal position of the condensing part 140 and the position of the first lens 141 on the basis of the position of the first lens 141 and the calculated distance to the object to be measured 10 (S280). It should be noted that the focal position of the condensing part 140 is a condensing distance z from the second lens 143 to the focal point of the condensing part 140. In the present embodiment, the correspondence calculation part 145 calculates the correspondence on the basis of the difference between the positions of the first lens 141 and the difference between the distances calculated by the distance calculation part 117 when the condensing part 140 is focused respectively on the first location and the second location on the object to be measured 10. Hereinafter, a specific method of calculating the correspondence will be described.

<Example of Derivation of Correspondence>

Here, supposing that the focal distance of the first lens 141 is $f_1$ and the focal distance of the second lens 143 is $f_2$, a composite focal distance F and a condensing distance z of the condensing part 140 are represented by the following equations. A design value or the like is used for the focal distances of the first lens 141 and the second lens 143, for example.

$$F = \frac{f_1 \cdot f_2}{f_1 + f_2 - d} \qquad \text{[Equation 1]}$$

$$z = F \cdot \left(1 - \frac{d}{f_1}\right) \qquad \text{[Equation 2]}$$

From [Equation 1] and [Equation 2], the relational expression of the inter-lens distance d and the condensing distance z is represented by the following equation.

$$d = f_1 + \frac{z \cdot f_2}{z - f_2} \qquad \text{[Equation 3]}$$

The following equation is obtained by substituting the inter-lens distance and the condensing distance, in cases where the focal points are at the first location and the second location respectively, into [Equation 3] and calculating the difference. Here, the left side $d_1 - d_2$ is a difference between the positions of the first lens 141, which can be calculated from the measurement result by the measurement apparatus 100. Therefore, the position of the first lens 141 detected by the position detection part 144 may be a relative value.

$$d_1 - d_2 = \frac{-f_2^2 \cdot (z_1 - z_2)}{(z_1 - f_2) \cdot (z_2 - f_2)} \qquad \text{[Equation 4]}$$

Also, the difference of the distance calculated by the distance calculation part 117 is represented as the following equation, and the left side $L_1 - L_2$ can be calculated from the measurement result realized by the measurement apparatus 100.

$$L_1 - L_2 = z_1 - z_2 \qquad \text{[Equation 5]}$$

From a simultaneous equation of [Equation 4] and [Equation 5], the values of the condensing distances $z_1$ and $z_2$ can be calculated. Thus, the correspondence calculation part 145 can calculate, from the measurement result realized by the measurement apparatus 100, the values of i) the inter-lens distance $d_1$ and the condensing distance $z_1$ in the first location and ii) the inter-lens distance $d_2$ and the condensing distance $z_2$ in the second location, which satisfy [Equation 3]. Further, the correspondence calculation part 145 can calculate the inner optical path difference $(L_{Lens} - L_{ref})$. Thus, since the correspondence calculation part 145 can specify the inter-lens distance and the condensing distance at the reference position, the correspondence calculation part 145 can calculate the inter-lens distance d with respect to an unknown condensing distance z or the absolute distance L on the basis of [Equation 3].

<Example of Correspondence>

Figure 3:
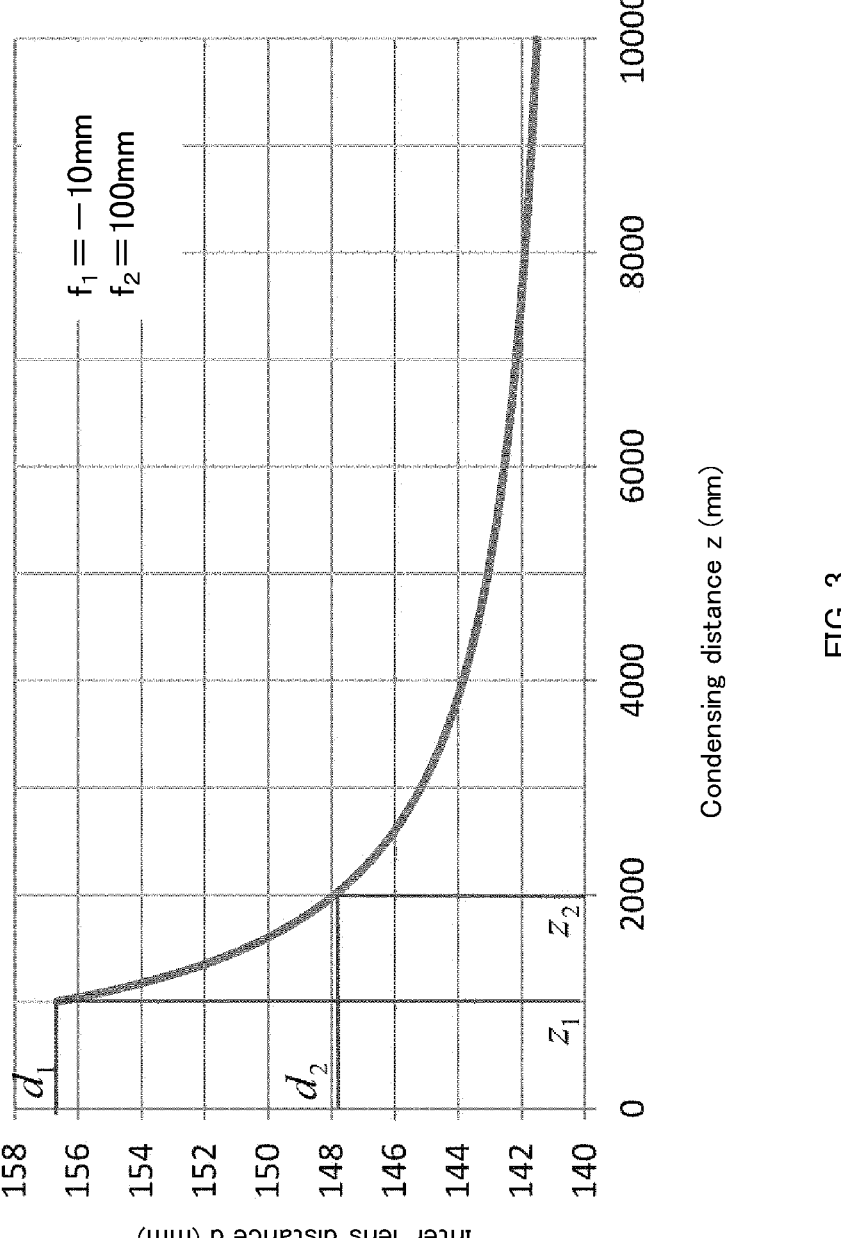
FIG. 3 shows an example of correspondence between a focal position of a condensing part 140 and a position of a first lens 141 calculated by a correspondence calculation part 145 according to the present embodiment.

FIG. 3 shows an example of the correspondence between the focal position of the condensing part 140 and the position of the first lens 141 calculated by the correspondence calculation part 145 according to the present embodiment. The horizontal axis of FIG. 3 represents the condensing distance z, and the vertical axis represents the inter-lens distance d. FIG. 3 shows an example in which the focal distance $f_1$ of the first lens 141 is assumed to be −10 mm, and the focal distance $f_2$ of the second lens 143 is assumed to be 100 mm. The correspondence calculation part 145 stores the calculated correspondence in the storage part 150. In reference to FIG. 3, it should be noted that the smaller the condensing distance z is, the bigger the change in the inter-lens distance d is. Thus, the reference positions such as the first location and the second location are preferably set at positions closer to the condensing part 140.

The measurement apparatus 100 according to the present embodiment calculates the distance d with respect to the condensing distance z or the absolute distance L as a part of the operation for the distance measurement. Thus, when the condensing position z' at which the condensing part 140 is to condense light is found, the measurement apparatus 100 can specify the inter-lens distance d' corresponding to the condensing position z', for example. In this instance, the control part 160 can quickly moves the first lens 141 to a position corresponding to the inter-lens distance d' to condense the measurement light at the condensing position z', as an example.

If the information concerning the geometry of the object to be measured 10 is stored in the storage part 150 or the like, or if the information concerning the geometry of the object to be measured 10 is provided from outside, the actual geometry of the object to be measured 10 may be measured by sequentially measuring a plurality of locations on the object to be measured 10 using the measurement apparatus 100, for example. There is a case where the geometry of the object to be measured 10 should be inspected or checked after the object to be measured 10 is manufactured on the basis of the information concerning the design values related to the geometry of the object to be measured 10, as an example. In this case, the measurement time becomes longer if a focal position is determined by sequentially performing autofocus operations on a plurality of locations on the object to be measured 10.

However, according to the measurement apparatus 100 according to the present embodiment, the control part 160 can determine the position to focus the measurement light on the basis of the correspondence and the information concerning the geometry of the object to be measured 10. The first location on the object to be measured 10 is determined in association with a predetermined reference position in the information concerning the geometry of the object to be measured 10, for example. Thus, this makes it possible to determine the next measurement position of the object to be measured 10 in accordance with the information concerning the geometry of the object to be measured 10, and the measurement apparatus 100 can quickly condense the measurement light by determining the next measurement position as the condensing position of the measurement light to specify the corresponding position of the first lens 141.

Therefore, the measurement apparatus 100 can measure the geometry of the object to be measured 10 by sequentially measuring a plurality of locations on the object to be measured 10 based on the previously calculated correspondence without performing autofocus operations. In this way, the measurement apparatus 100 can quickly and sequentially focus the measurement light on the appropriate location on the object to be measured 10 for each position to be measured.

It should be noted that the measurement apparatus 100 may measure the geometry of an object different from the object to be measured 10 after calculating the correspondence between the focal position of the condensing part 140 and the position of the first lens 141 using the object to be measured 10. In this instance, the different object preferably has the same geometry as the object to be measured 10, and is preferably arranged with the same arrangement as the object to be measured 10. Further, even if the different object has a geometry different from that of the object to be measured 10, the measurement apparatus 100 can measure the geometry of the different object using the calculated correspondence similarly to the object to be measured 10 by acquiring information on the distance between at least one location in the geometry and the reference location such as the first location on the object to be measured 10. Further, when the distance measurement for a predetermined number of times is completed, or when a predetermined time has passed, the measurement apparatus 100 may calculate the correspondence between the focal position of the condensing part 140 and the position of the first lens 141.

In the measurement apparatus 100 according to the present embodiment described above, an example of calculating the correspondence between the focal position of the condensing part 140 and the position of the first lens 141 by condensing the measurement light at two reference positions has been described, but the calculation is not limited to this. The measurement apparatus 100 may calculate such a correspondence on the basis of the information on the inner optical path difference and condensing the measurement light at one reference position. The operation of the measurement apparatus 100 will be described.

<Variation Example of an Operation of the Measurement Apparatus 100>

Figure 4:
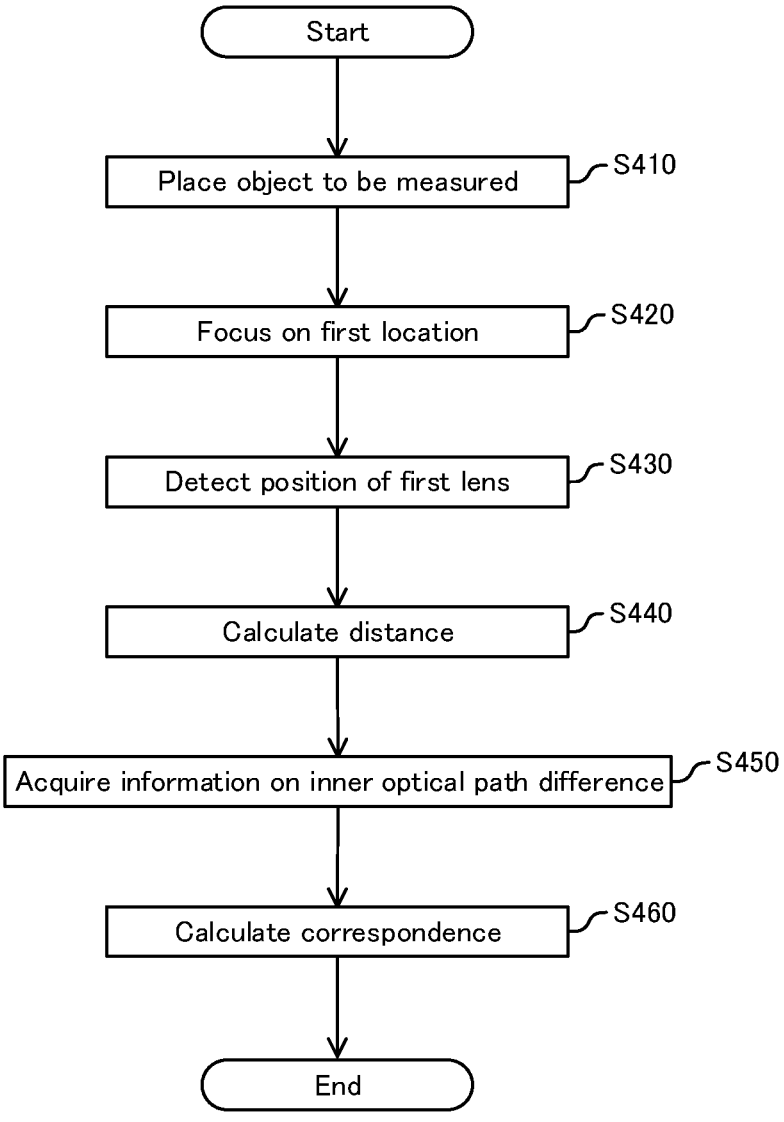
FIG. 4 is a flowchart illustrating a variation example of an operation of the measurement apparatus 100 according to the present embodiment.

FIG. 4 is a flowchart illustrating a variation example of an operation of the measurement apparatus 100 according to the present embodiment. The measurement apparatus 100 performs the setting for the measurement operation by executing the operations from step S410 to step S460.

First, the object to be measured 10 is placed in a measurable range of the measurement apparatus 100 (S410). Then, the measurement light is condensed and focused onto the first location on the object to be measured 10 using the measurement apparatus 100 (S420). Next, the position detection part 144 detects the position of the first lens 141 (S430). The distance calculation part 117 then calculates the distance to the object to be measured 10 (S440). The operations from step S410 to step S440 may be the same operations as the operations from step S210 to step S240 of FIG. 2, and the explanation thereof is omitted here.

Next, the correspondence calculation part 145 acquires information on the inner optical path difference of the measurement apparatus 100 (S450). Here, the inner optical path difference is an optical path difference between the reference light and the measurement light inside the measurement apparatus 100, and is $(L_{Lens}-L_{ref})$, as an example. The storage part 150 may store the information on the inner optical path difference measured in advance, and the correspondence calculation part 145 reads and acquires the information concerning the inner optical path difference from the storage part 150, for example.

The inner optical path difference substantially matches the optical path difference between the light reflected from the lens face of the second lens 143 and the reference light, for example. Therefore, the inner optical path difference can be measured by providing a reflecting member or the like on a portion of the lens face of the second lens 143, as an example. The correspondence calculation part 145 may acquire, as an inner optical path difference, the absolute distance calculated by the distance calculation part 117 in this case. It should be noted that the reflecting member is preferably a member detachable from the surface of the second lens 143. The reflecting member is, for example, a reflective film.

Alternatively, the design value of the optical system may be stored in advance in the storage part 150 as the inner optical path difference, or the value measured by another measurement apparatus or a measurement instrument or the like may be stored in advance in the storage part 150. It should be noted that the operation of step S450 does not need to follow the operations from step S410 to step S440, and thus may be executed prior to the operation of step S410, may be executed between the operations from step S410 to step S440, or may be executed in parallel with any of the operations from step S410 to step S440.

Next, the correspondence calculation part 145 calculates the correspondence on the basis of the acquired inner optical path difference, the position of the first lens 141 and the distance calculated by the distance calculation part 117 when the condensing part 140 is focused on the first location on the object to be measured 10 (S460). The correspondence calculation part 145 can calculate the condensing distance $z_1$ from the inner optical path difference $(L_{Lens}-L_{ref})$ and the first distance $L_1$ $(L_{Lens}+z_1-L_{ref})$, for example. Then, it is possible to calculate the inter-lens distance $d_1$ corresponding to the condensing distance $z_1$ from [Equation 3].

In this manner, the correspondence calculation part 145 can acquire the inner optical path difference $(L_{Lens}-L_{ref})$, the inter-lens distance $d_1$, and the condensing distance $z_1$ at the first location. Therefore, the correspondence calculation part 145 can express an unknown inter-lens distance d as a moving amount from the inter-lens distance $d_1$ of the first location, thereby calculating the condensing distance z or the absolute distance L with respect to the inter-lens distance d on the basis of [Equation 3]. That is, the measurement apparatus 100 can calculate the correspondence between the focal position of the condensing part 140 and the position of the first lens 141 even when executing the operations according to the present variation.

In the measurement apparatus 100 according to the present embodiment, an example of measuring the geometry of the object to be measured 10 by calculating the correspondence between the focal position of the condensing part 140 and the position of the first lens 141 on the basis of the correspondence, but the measurement is not limited to this. The measurement apparatus 100 may evaluate the defocus amount of an autofocus operation on the basis of the calculated correspondence, and may calculate the order of the interference of the interference detection part 116. Such measurement apparatus 100 will be described below.

<Variation Example of the Measurement Apparatus 100>

Figure 5:
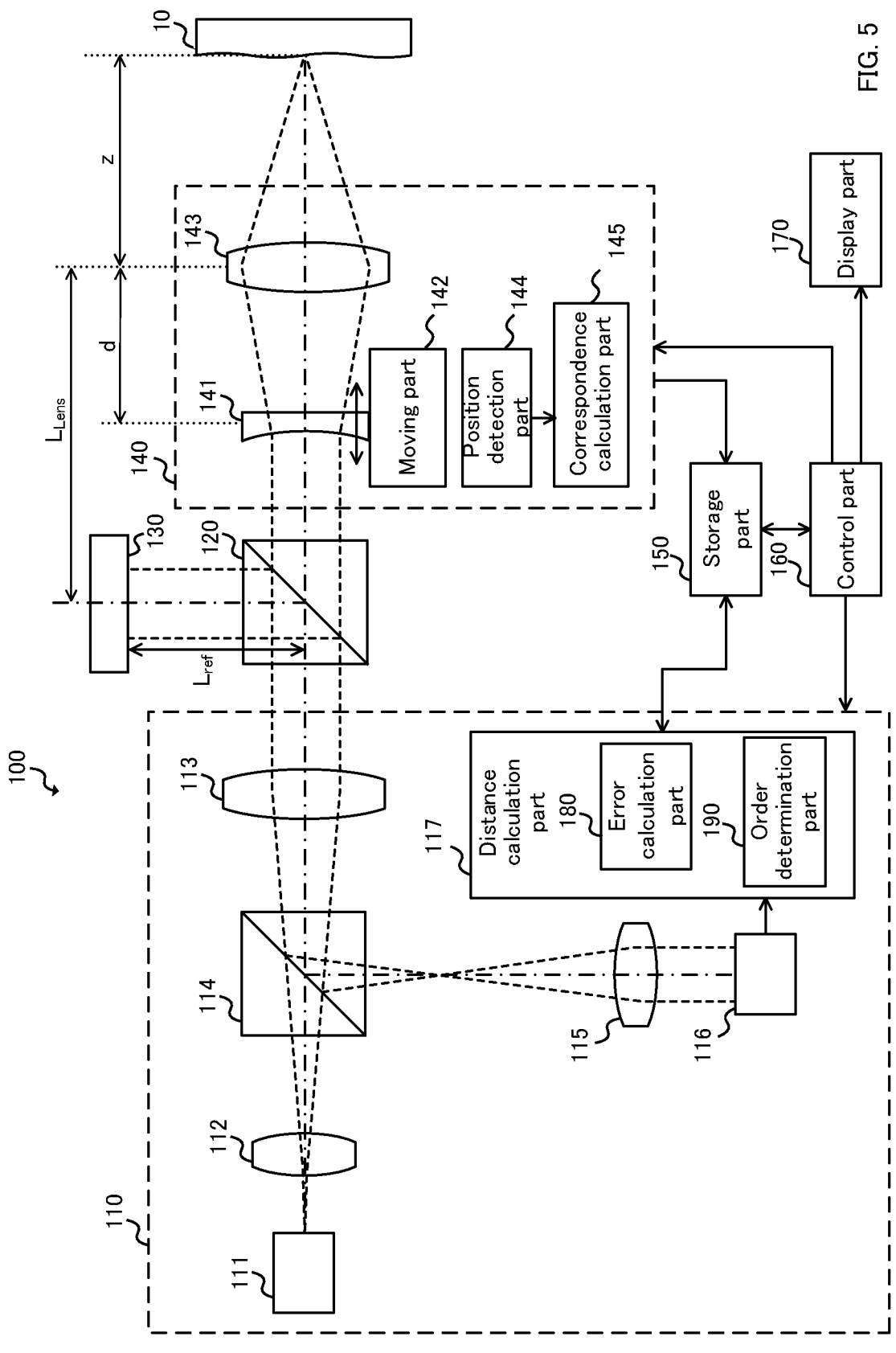
FIG. 5 shows a variation example of the measurement apparatus 100 according to the present embodiment together with the object to be measured 10.

FIG. 5 shows a variation example of the measurement apparatus 100 according to the present embodiment together with the object to be measured 10. In the measurement apparatus 100 of the present variation example, the same reference numerals are assigned to components that have substantially the same operations as in the measurement apparatus 100 according to the present embodiment shown in FIG. 1, and description thereof is omitted. In the measurement apparatus 100 of the present variation example, the distance calculation part 117 includes an error calculation part 180 and an order determination part 190. Needless to say, the measurement apparatus 100 may be configured such that the distance calculation part 117 includes either the error calculation part 180 or the order determination part 190.

The error calculation part 180 acquires the correspondence between the focal position of the condensing part 140 and the position of the first lens 141 calculated by the corresponding calculation part 145 as described above. The error calculation part 180 calculates the error of the focal position of the condensing part 140 on the basis of the detection result of the position of the first lens 141 and the acquired correspondence when the distance to the object to be measured 10 was calculated. A case where the control part 160 aligns the condensing position of the condensing part 140 using an autofocus operation and measures the distance to the object to be measured 10 is considered, for example.

The error calculation part 180 acquires information concerning the position d" of the first lens 141 automatically adjusted by the control part 160 and an absolute distance L" calculated by the distance calculation part 117, for example. In addition, the error calculation part 180 acquires, from the correspondence stored in the storage part 150, information concerning a condensing distance $z_0$ corresponding to the position d" of the first lens 141. The error calculation part 180 adds the inner optical path difference to the condensing distance $z_0$ to calculate the index $L_0$ of the absolute distance. Then, the error calculation part 180 sets $\Delta z$, a difference between the calculated absolute distance L" and the index $L_0$, as a defocus amount (error) of an autofocus operation.

Thus, the error calculation part 180 calculates the error $\Delta z$ of the focal position in a case where an autofocus operation is performed, and the distance calculation part 117 outputs the calculation result L" of the distance and the error $\Delta z$ of the calculated focal position, in association with each other. Thus, the user or the like of the measurement apparatus 100 can grasp the error $\Delta z$, and can determine the status of the measurement apparatus 100 on the basis of the magnitude, change over time, and the like of the error $\Delta z$, for example. In the present embodiment, the calculation result $\Delta z$ of the error calculation part 180 is described as an error of the focal position, but does not necessarily mean a strict measurement error, and $\Delta z$ is used as an indicator of the error of the focus operation, for example.

In the present embodiment, an example in which the error calculation part 180 calculates the value of the error is described, but the present disclosure is not limited thereto. The storage part 150 may store i) the correspondence between information concerning the calculation result of the distance and information concerning the error of the detected position of the first lens 141, or ii) the correspondence between information concerning the calculation result of the distance and information concerning the range of the error, for example. Thus, when the measurement apparatus 100 performs the autofocus operation, the error calculation part 180, in accordance with the calculation result of the distance to the object to be measured 10 and the detection result of the position of the first lens 141, can quickly identify and output the corresponding error.

The order determination part 190 determines the order of the interference of the interference signal on the basis of the correspondence calculated by the correspondence calculation part 145. Since variations in the intensity of the interference signal repeat with cycles of an interference wave, there may be a plurality of solutions for the distance calculated by the distance calculation part 117. Therefore, a method of determining the order of the interference of an interference signal by repeating the distance measurement twice has been known (Non-Patent Document 2).

However, since the measurement apparatus 100 according to the present embodiment calculates the correspondence between the focal position of the condensing part 140 and the position of the first lens 141, the focal position of the condensing part 140 can be specified according to the detection results of the position of the first lens 141. Since the focal position of the condensing part 140 substantially corresponds to the position of the object to be measured 10, the focal position can be converted into a distance to the object to be measured 10 within one cycle of the interference wave. Therefore, the order determination part 190 can determine the order of the interference signal in accordance with the determination of the position of the first lens 141. Thus, the distance calculation part 117 can calculate the distance to the object to be measured 10 on the basis of the interference signal detected by a single distance measurement and the order of the determined interference.

The distance calculation part 117, the correspondence calculation part 145, the storage part 150, and the control part 160 according to the present embodiment described above are formed by an integrated circuit, for example. In this instance, at least a part of the distance calculation part 117, the correspondence calculation part 145, the storage part 150, and the control part 160 includes a Field Programmable Gate Array (FPGA), a Digital Signal Processor (DSP), and/or a Central Processing Unit (CPU).

When a computer or the like functions as the distance calculation part 117, the correspondence calculation part 145, and the control part 160, the storage part 150 may store an Operating System (OS) for operating the computer or the like and programs or the like, for example. Additionally, the storage part 150 may store various pieces of information including databases that are referred to when executing the programs. The computer functions as at least a part of the distance calculation part 117, the correspondence calculation part 145, and the control part 160 by executing the programs stored in the storage part 150, for example.

The storage part 150 includes a Read Only Memory (ROM) for storing a Basic Input Output System (BIOS) of a computer or the like and a Random Access Memory (RAM) as a work area, for example. Also, the storage part 150 may include a mass-storage device such as a Hard Disk Drive (HDD) and/or a Solid State Drive (SSD). Further, the computer may further include a Graphics Processing Unit (GPU) or the like.

The present disclosure is explained on the basis of the exemplary embodiments. The technical scope of the present disclosure is not limited to the scope explained in the above embodiments and it is possible to make various changes and modifications within the scope of the disclosure.

For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments. The effect of the new embodiment caused by the combination has the effect of the original embodiment together.

What is claimed is:

1. A measurement apparatus comprising:
   a laser apparatus that outputs a laser beam;
   a branching part that splits the laser beam into (i) a reference light, which is a portion of the laser beam, for being radiated to a reference surface, and (ii) a measurement light, which is at least part of the remaining portion of the laser beam, for being radiated to an object to be measured;
   a condensing part that condenses the measurement light onto the object to be measured;

a control part that adjusts a focal position where the condensing part condenses the measurement light; and a distance calculation part that calculates the distance to the object to be measured on the basis of an optical path difference between the reference light reflected by the reference surface and the measurement light reflected by the object to be measured, wherein the condensing part includes:

a first lens where the measurement light enters, a moving part that moves the first lens in an optical axis direction, a position detection part that detects the position of the first lens, a second lens that radiates the measurement light emitted from the first lens towards the object to be measured, and a correspondence calculation part that calculates correspondence between a focal position of the condensing part and a position of the first lens on the basis of the position of the first lens and the distance to the object to be measured calculated by the distance calculation part when the condensing part is focused on the object to be measured, wherein the control part controls the moving part and moves the first lens to adjust the focal position where the second lens condenses the measurement light, while maintaining a constant inner optical path difference that indicates an optical path difference between the optical path of the measurement light from the branching part to the second lens and the optical path of the reference light from the branching part to the reference surface.

2. The measurement apparatus according to claim 1, wherein the correspondence calculation part calculates the correspondence on the basis of the difference between the positions of the first lens and the difference between the distances calculated by the distance calculation part when the condensing part is focused respectively on a first location and a second location on the object to be measured.

3. The measurement apparatus according to claim 2, wherein the control part moves the first lens to satisfy a relational expression of the following equation calculated by the correspondence calculation part, where $f_1$ is a focal distance of the first lens, $f_2$ is a focal distance of the second lens, d is an inter-lens distance of the first lens and the second lens, and z is a condensing distance from the second lens to the focal point where the condensing part condensed the measurement light $$d = f_1 + \frac{z \cdot f_2}{z - f_2}. \tag{1}$$

4. The measurement apparatus according to claim 3, wherein the correspondence calculation part calculates the values of a) an inter-lens distance $d_1$ and an condensing distance $z_1$ at the first location on the object to be measured and b) an inter-lens distance $d_2$ and a condensing distance $z_2$ at the second location using the following equation, where $L_1$ is a first distance from the measurement apparatus to the first location on the object to be measured calculated by the distance calculation part, and $L_2$ is a second distance from the measurement apparatus to the second location on the object to be measured calculated by the distance calculation part $$d_1 - d_2 = \frac{-f_2^2 \cdot (z_1 - z_2)}{(z_1 - f_2) \cdot (z_2 - f_2)} \tag{2}$$

$$L_1 - L_2 = z_1 - z_2. \tag{3}$$

5. The measurement apparatus according to claim 4, wherein the correspondence calculation part further calculates an inner optical path difference that indicates an optical path difference between the measurement light and the reference light inside the measurement apparatus by deducting the condensing distance $z_1$ of the first location on the object to be measured from the first distance $L_1$, or by deducting the condensing distance $z_2$ of the second location on the object to be measured from the second distance $L_2$.

6. The measurement apparatus according to claim 1, wherein the correspondence calculation part calculates the correspondence on the basis of the inner optical path difference between the reference light and the measurement light inside the measurement apparatus, the position of the first lens, and the distance calculated by the distance calculation part when the condensing part is focused on a first location on the object to be measured.

7. The measurement apparatus according to claim 1, further comprising:

a storage part that stores information concerning a geometry of the object to be measured, wherein the control part determines a position at which to focus the measurement light on the basis of the correspondence and the information concerning the geometry of the object to be measured.

8. The measurement apparatus according to claim 1, wherein the distance calculation part further includes:

an error calculation part that calculates an error of the focal position of the condensing part on the basis of the detection result of the position of the first lens and the correspondence when calculating a distance to the object to be measured, and the distance calculation part outputs the calculation result of the distance and the calculated error of the focal position, associating with each other.

9. The measurement apparatus according to claim 1, further comprising:

an interference detection part that detects an interference signal based on an optical path difference between the reference light and the measurement light, wherein the distance calculation part includes an order determination part that determines an order of interference of the interference signal on the basis of the correspondence calculated by the correspondence calculation part, and the distance calculation part calculates a distance to the object to be measured on the basis of the detected interference signal and the determined order of the interference.

10. A measurement method comprising:

outputting a laser beam;

splitting the laser beam into (i) a reference light, which is a portion of the laser beam, for being radiated to the reference surface, and (ii) a measurement light, which is at least part of the remaining portion of the laser beam, for being radiated to an object to be measured;

condensing the measurement light by focusing the measurement light on the object to be measured using a condensing part having a first lens and a second lens;

calculating a distance to the object to be measured on the basis of an optical path difference between the reference light reflected by the reference surface and the measurement light reflected by the object to be measured; and calculating a correspondence between a focal position of the condensing part and the position of the first lens on the basis of the position of the first lens and the calculated distance to the object to be measured; wherein the condensing includes:

making the measurement light enter the first lens, radiating, through the second lens, the measurement light emitted from the first lens towards the object to be measured, moving the first lens so that the focal position where the second lens condenses the measurement light is aligned on the object to be measured, while maintaining a constant inner optical path difference that indicates an optical path difference between the optical path of the measurement light from the position where the laser light branches as the measurement light to the second lens and the optical path of the reference light from the position where the laser light branches as the reference light to the reference plane; and detecting the position of the first lens.

11. A measurement apparatus comprising:

a laser that outputs a laser beam;

a branch that splits the laser beam into (i) a reference light, which is a portion of the laser beam, for being radiated to a reference surface, and (ii) a measurement light, which is at least part of the remaining portion of the laser beam, for being radiated to an object to be measured;

a condenser that condenses the measurement light onto the object to be measured;

control circuitry configured to adjust a focal position where the condenser condenses the measurement light; and distance calculation circuitry configured to calculate the distance to the object to be measured on the basis of an optical path difference between the reference light reflected by the reference surface and the measurement light reflected by the object to be measured, wherein the condenser includes:

a first lens where the measurement light enters, a moving device that moves the first lens in an optical axis direction, a position detection circuit that detects the position of the first lens, a second lens that radiates the measurement light emitted from the first lens towards the object to be measured, and correspondence calculation circuitry configured to calculate correspondence between a focal position of the condenser and a position of the first lens on the basis of the position of the first lens and the distance to the object to be measured calculated by the distance calculation circuitry when the condenser is focused on the object to be measured, wherein the control circuitry is further configured to control the moving device and moves the first lens to adjust the focal position where the second lens condenses the measurement light, while maintaining a constant inner optical path difference that indicates an optical path difference between the optical path of the measurement light from the branch to the second lens and the optical path of the reference light from the branch to the reference surface.

* * * * *